United States Patent
Adkins et al.

(10) Patent No.: US 8,032,172 B2
(45) Date of Patent: *Oct. 4, 2011

(54) METHOD AND APPARATUS FOR FORWARD LINK GAIN CONTROL IN A POWER CONTROLLED REPEATER

(75) Inventors: Keith L. Adkins, Boulder, CO (US); Charles E. Wheatley, III, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 12/062,351

(22) Filed: Apr. 3, 2008

(65) Prior Publication Data
US 2008/0182511 A1 Jul. 31, 2008

Related U.S. Application Data

(63) Continuation of application No. 10/184,733, filed on Jun. 27, 2002, now Pat. No. 7,355,993.

(51) Int. Cl.
*H04B 7/00* (2006.01)
*H04Q 7/20* (2006.01)
(52) U.S. Cl. ......... 455/522; 455/11.1; 455/13.4; 455/69
(58) Field of Classification Search ............... 455/24, 455/7, 11.1, 13.4, 9, 69, 67.11, 517, 522; 370/318, 279, 315, 316
See application file for complete search history.

(56) References Cited

U.S. PATENT DOCUMENTS

| | | | |
|---|---|---|---|
| 4,901,307 | A | 2/1990 | Gilhousen et al. |
| 5,101,501 | A | 3/1992 | Gilhousen et al. |
| 5,103,459 | A | 4/1992 | Gilhousen et al. |
| 5,799,005 | A | 8/1998 | Soliman |
| 5,835,848 | A | 11/1998 | Bi et al. |
| 6,088,335 | A | 7/2000 | I et al. |

(Continued)

FOREIGN PATENT DOCUMENTS
EP 0418103 3/1991
(Continued)

OTHER PUBLICATIONS

Arenaccio, S. et al., "Performance, Implementation and Network Management Techniques for a European CDMA-Based Land-Mobile Satellite System," Global Telecommunications Conference, GLOBECOM '90. Dec. 1990 vol. 2. pp. 738-745.

(Continued)

*Primary Examiner* — John J Lee
(74) *Attorney, Agent, or Firm* — Linda G. Gunderson

(57) ABSTRACT

A power controlled repeater is disclosed for use in a wireless communication system to control the forward link gain. The power controlled repeater includes a forward link for communications from a base station to a mobile station. In addition, the power controlled repeater includes a reverse link for communications from the mobile station to the base station. An embedded subscriber unit is used at the power controlled repeater and is inserted into the forward link. A microprocessor is in electronic communications with the subscriber unit and implements a method for controlling the forward link gain. The method for controlling the forward link gain includes using the embedded subscriber unit in the power controlled repeater to control the forward link gain.

20 Claims, 7 Drawing Sheets

U.S. PATENT DOCUMENTS

| | | | |
|---|---|---|---|
| 6,125,109 A * | 9/2000 | Fuerter | 370/315 |
| 6,240,124 B1 | 5/2001 | Wiedeman et al. | |
| 6,731,620 B1 | 5/2004 | Lim et al. | |
| 6,801,754 B2 * | 10/2004 | Talwalkar et al. | 455/15 |
| 6,996,385 B2 | 2/2006 | Messier et al. | |
| 7,020,436 B2 | 3/2006 | Schmutz | |
| 7,308,015 B2 | 12/2007 | Takano et al. | |
| 2001/0031624 A1 * | 10/2001 | Schmutz | 455/13.4 |
| 2002/0045461 A1 | 4/2002 | Bongfeldt | |

FOREIGN PATENT DOCUMENTS

| | | |
|---|---|---|
| EP | 0977371 | 2/2000 |
| EP | 1022849 | 7/2000 |
| GB | 2281458 | 3/1995 |
| JP | 11331054 | 11/1999 |
| JP | 2001007762 | 1/2001 |
| JP | 2001285932 | 10/2001 |
| JP | 2002077020 | 3/2002 |
| JP | 2002152104 | 5/2002 |
| TW | 484334 | 4/2002 |
| WO | WO0150635 | 7/2001 |

OTHER PUBLICATIONS

International Search Report—PCT/US2003/020404—European Patent Office, May 20, 2004.

Supplementary European Search Report—EP03742291, Search Authority—Hauge Patent Office, Mar. 16, 2010.

Taiwanese Search report—092117675—TIPO—Sep. 27, 2010.

* cited by examiner

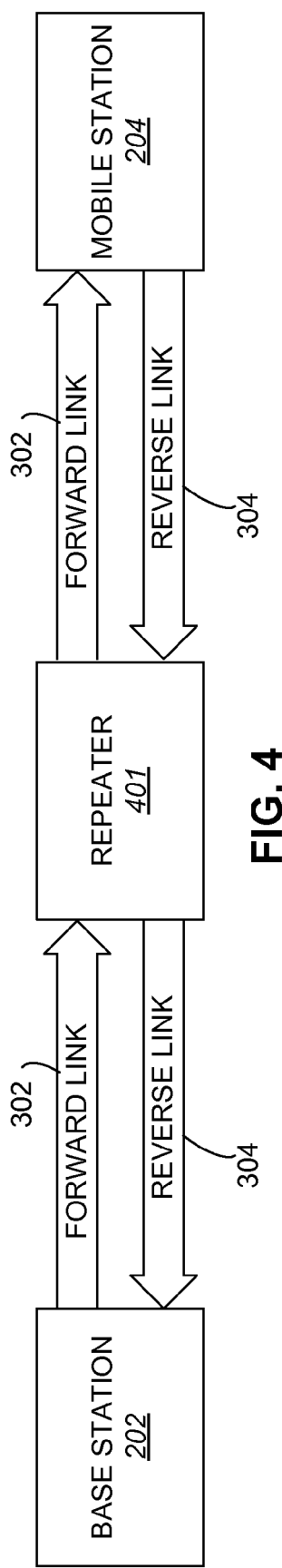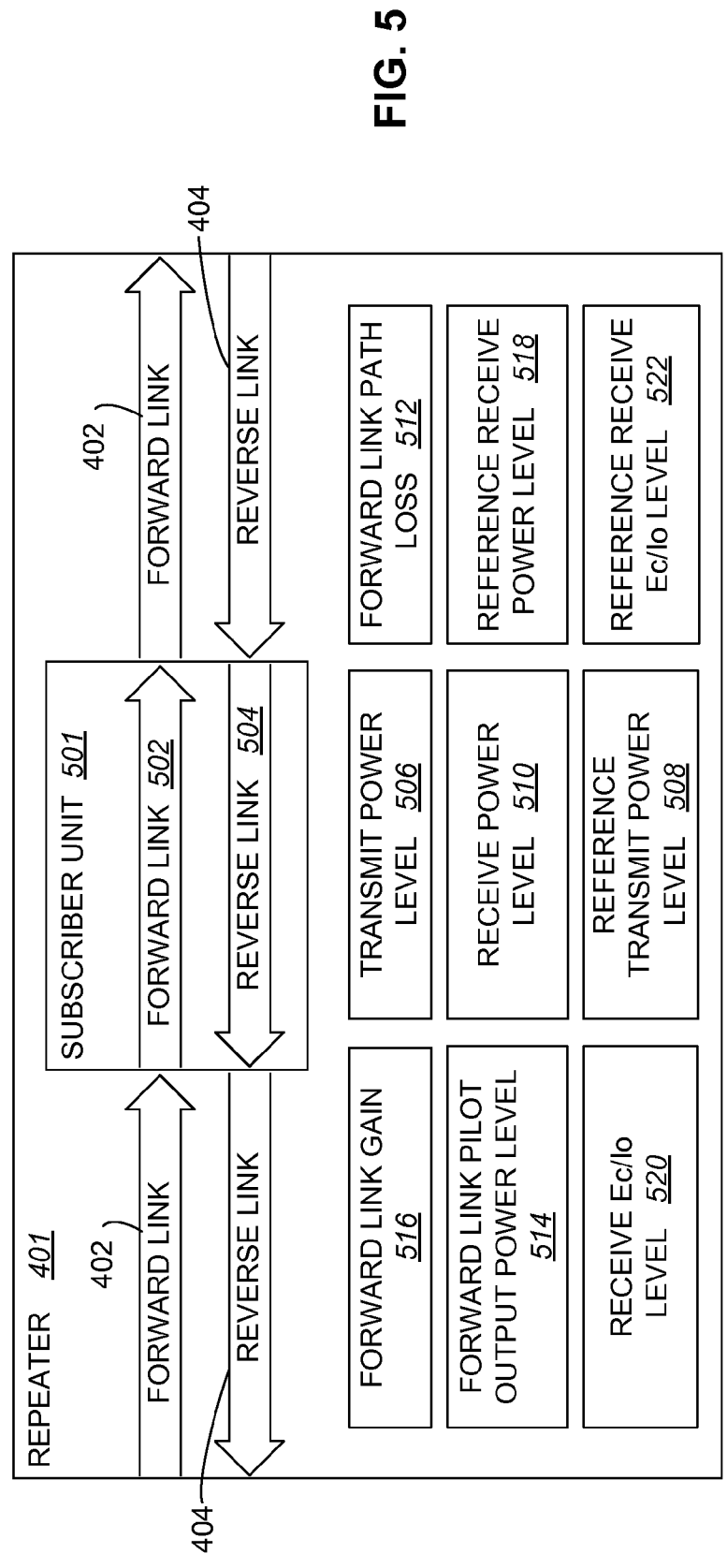

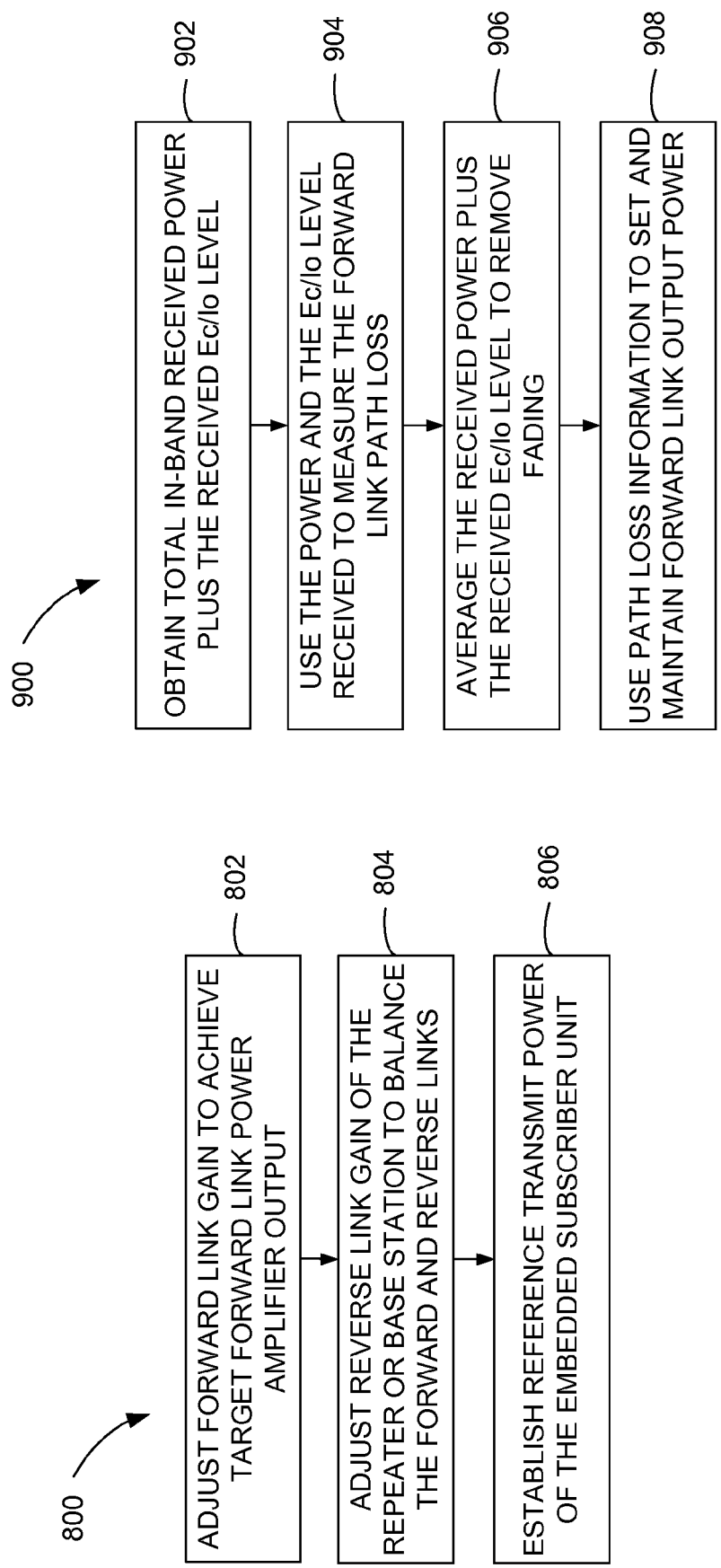

METHOD AND APPARATUS FOR FORWARD LINK GAIN CONTROL IN A POWER CONTROLLED REPEATER

CROSS-REFERENCE TO RELATED APPLICATIONS

This is a continuation of and claims the benefit of priority from U.S. patent application Ser. No. 10/184,733, filed on Jun. 27, 2002, entitled "Method and Apparatus for Forward Link Gain Control in a Power Controlled Repeater," which is hereby incorporated by reference in its entirety.

FIELD

The present invention relates to wireless communication systems generally and specifically, to methods and apparatus for controlling the forward link gain in a power controlled repeater.

BACKGROUND

In a wireless radiotelephone communication system, many users communicate over a wireless channel. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference. An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

In a typical system, several base stations are deployed to allow numerous mobile users to communicate with the base stations as they travel. The communications networks would typically include a base station controller or similar device that exchanges communications with multiple base stations. Examples of the communications networks include public switched networks, wireless networks, satellite networks, long distance telephone networks, local telephone networks, and the Internet.

A repeater may be used to extend the range of the base station. The repeater receives wireless signals from a base station and one or more mobile users. The repeater amplifies the received signals and transmits wireless signals based on the amplified signals to the base station and/or to the mobile users. As a result, the repeater extends the range of the base station. The base station also typically receives wireless signals from other mobile stations directly (i.e., without using the repeater).

Repeaters provide a cost-effective way for carriers and service providers to fill holes in the coverage area or to augment the area of coverage. However, the use of repeaters is hindered by daily and seasonal changes in the environment, which cause fluctuations in both the gain of the repeater and the path loss between the repeater and the base station. These fluctuations could adversely affect the coverage and service in repeater coverage area. There is a need, therefore, to control the gain of the repeater to stabilize the repeater coverage area.

BRIEF DESCRIPTION OF THE DRAWINGS

FIG. 4 is a block diagram illustrating the use of a repeater with the base station and mobile station.

FIG. 5 is a block diagram of an embodiment of a repeater with an embedded subscriber unit.

FIG. 8 is a flow diagram of one embodiment of a method for deploying a power controlled repeater.

FIG. 9 is a flow diagram illustrating a method for controlling the forward link gain of a repeater through use of an embedded subscriber unit.

DETAILED DESCRIPTION

Figure 1:
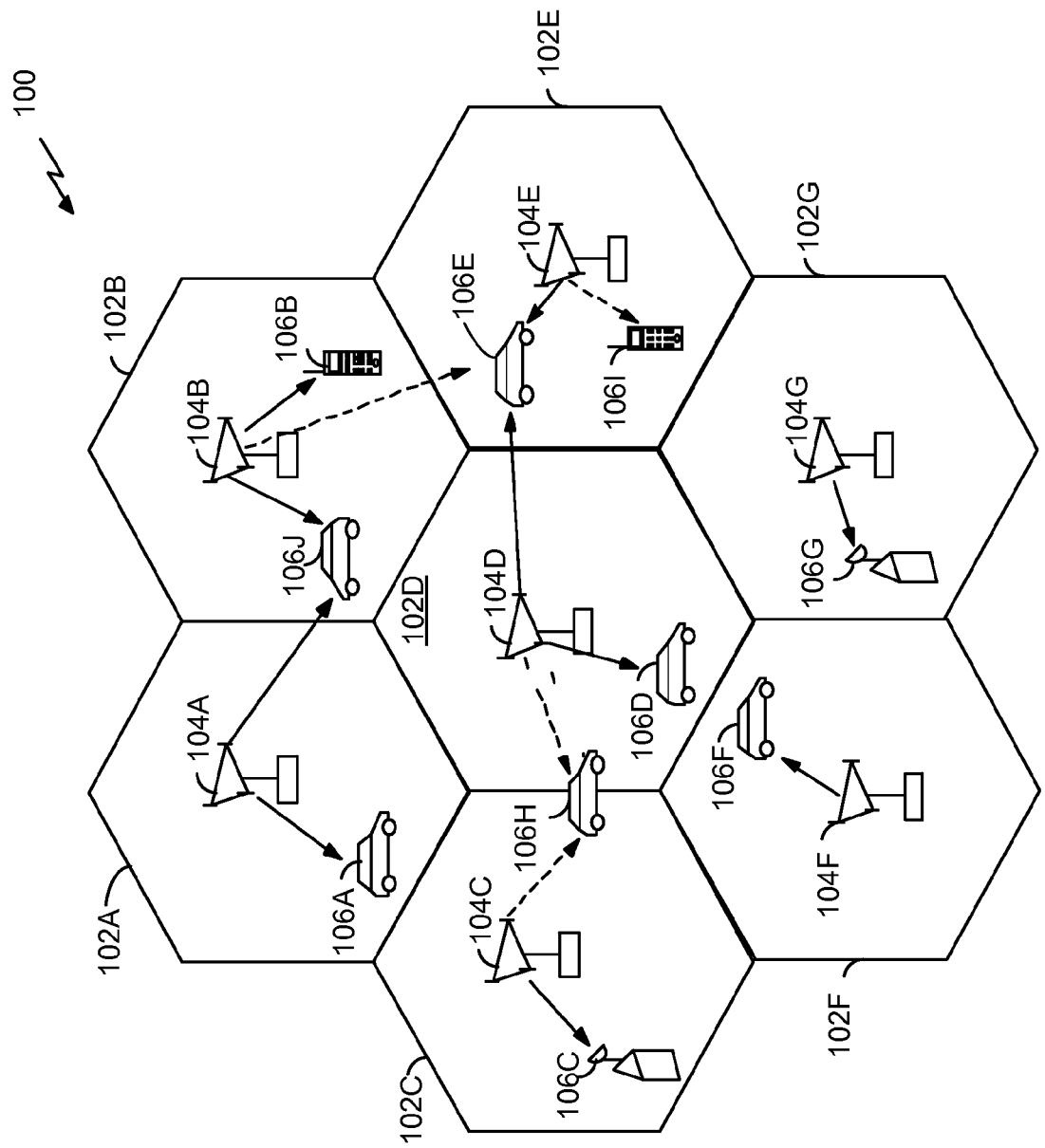
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops methods and apparatus for controlling the forward link gain in a power controlled repeater. First an exemplary spread-spectrum wireless communication system is introduced. Particulars regarding a base station, a mobile station and electronic communications there between are set forth. The use of a repeater to extend the coverage of a base station is explained. Details regarding the use of an embedded subscriber unit in a repeater to achieve forward link gain control are illustrated through several block diagrams and flow diagrams. A typical embodiment of a subscriber unit is also discussed.

Note that the exemplary embodiment is provided as an exemplar throughout this discussion; however, alternate embodiments may incorporate various aspects without departing from the scope of the present invention.

The exemplary embodiment employs a spread-spectrum wireless communication system. Wireless communication systems are widely deployed to provide various types of communication such as voice, data, and so on. These systems may be based on CDMA, TDMA, or some other modulation techniques. A CDMA system provides certain advantages over other types of systems, including increased system capacity. CDMA systems transmit and receive wireless signals within a single frequency band and use codes to separate the individual signals. In contrast, other systems use frequency and time division to separate the individual signals. CDMA systems have demonstrated clear advantages in the areas of capacity, voice quality, privacy, and cell hand-off.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma2000 standard of protocols. Alternate embodiments may incorporate another standard.

FIG. 1 serves as an example of a communications system 100 that supports a number of users and is capable of implementing at least some aspects of the embodiments discussed herein. Any of a variety of algorithms and methods may be used to schedule transmissions in the system 100. The system 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the forward link and reverse link at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The forward link refers to transmission from the base station 104 to the terminal 106, and the reverse link refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Figure 2:
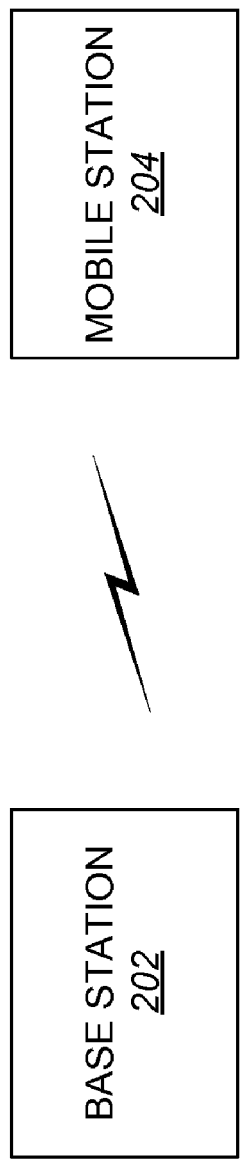
FIG. 2 is a block diagram of a base station and a mobile station in a communications system.

FIG. 2 is a block diagram of the base station 202 and mobile station 204 in a communications system. A base station 202 is in wireless communications with the mobile station 204. As mentioned above, the base station 202 transmits signals to mobile stations 204 that receive the signals. In addition, mobile stations 204 may also transmit signals to the base station 202.

Figure 3:
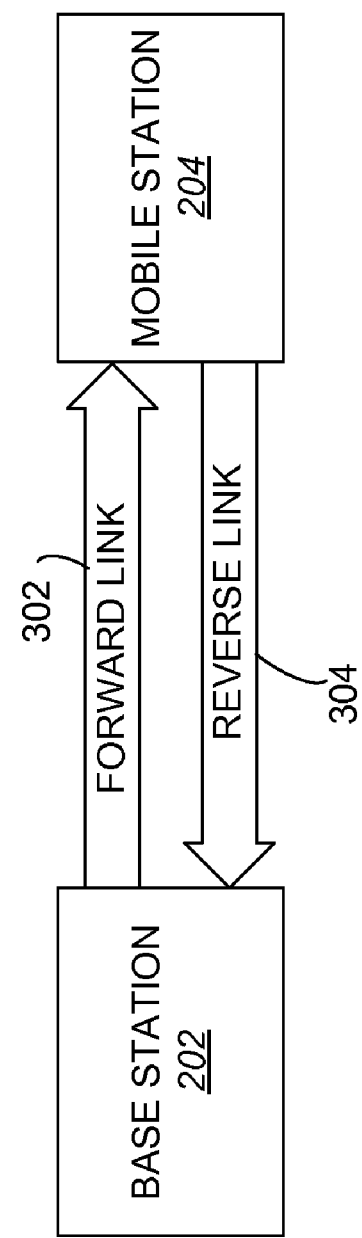
FIG. 3 is a block diagram illustrating the forward link and the reverse link between the base station and the mobile station.

FIG. 3 is a block diagram of the base station 202 and the mobile station 204 illustrating the forward link 302 and the reverse link 304. As discussed, the forward link 302 refers to transmissions from the base station 202 to the mobile station 204. The forward link 302 may sometimes be referred to as the downlink. The reverse link 304 refers to transmissions from the mobile station 204 to the base station 202. The reverse link 304 may sometimes be referred to as the uplink.

As will be illustrated in relation to FIG. 4, a repeater may be used with the base station 202 and mobile station 204. A repeater extends the range of the base station 202 by amplifying and retransmitting the wireless signals between the mobile station 204 and the base station 202. The following discusses relevant issues such as multipath and fading. Following the discussion, FIG. 4 will introduce a repeater.

Multipath signals are different versions of the same wireless signal that are generated by reflections from structures and natural formations. Multipath signals can have phase shifts that cause the signals to cancel each other out at certain locations. The loss of a signal due to the phase cancellation of multipath signals is known as fading. Fading is a serious problem in wireless systems because it disrupts user communications. For example, several multipath copies of a single wireless signal transmitted by a wireless communications device may be generated by reflections from trees and buildings. These multipath copies may combine in the repeater or mobile station 204 and cancel each other out due to phase offset.

Unlike other wireless systems, CDMA systems can process multipath signals to provide additional diversity. Unfortunately, multipath signals that are not separated by a sufficient time delay may still cause fading in a CDMA system. Signal power is typically increased to overcome fading, but the increased signal power reduces the range of the system.

In a typical system, several base stations 202 are deployed to allow numerous mobile stations 204 to communicate with the base stations 202 as they travel. The communications networks 100 would typically include a base station controller (not shown) or similar device that exchanges communications with multiple base stations 202. Examples of the communications networks 100 include public switched networks, wireless networks, satellite networks, long distance telephone networks, local telephone networks, and the Internet.

FIG. 4 is a block diagram illustrating the use of a repeater 401 with the base station 202 and mobile station 204. The wireless repeater 402 is sometimes used between the mobile station 204 and the base station 202. The repeater 402 extends the range of the base station 202 by amplifying and re-transmitting the wireless signals between the mobile station 204 and the base station 202. Although not shown, the base station 202 also typically receives wireless signals from other mobile stations 204 without using the repeater 401.

Repeaters 401 provide a cost-effective way for carriers and service providers to fill holes in the coverage area or to augment the area of coverage. However, the use of repeaters 401 is hindered by daily and seasonal changes in the environment, which cause fluctuations in both the gain of the repeater 401 and the path loss between the repeater 401 and the base station 202. These fluctuations could adversely affect the coverage and service in the repeater 401 coverage area.

Referring now to FIG. 5, it is desirable to control the forward link gain of the repeater 401 to stabilize the repeater coverage area. This may be accomplished by embedding a subscriber unit 501 inside the repeater 401 and injecting the forward link 402 of the repeater 401 into the forward link 502 of the embedded subscriber unit 501.

The embedded subscriber unit 501 allows the fluctuations described above to be overcome. In addition, there is more consistent coverage and service to mobile stations 204 in the repeater 401 coverage area.

The deployment of a power-controlled repeater 401 is similar to that of a conventional repeater. One extra step that is needed is to have the embedded subscriber unit 501 establish a reference forward link power level to go along with the nominal repeater gain and the nominal repeater forward link gain. The reference forward link power level may include a reference receive power level 518, a reference receive Ec/Io level 522, and/or a reference transmit power level 508.

In order to maintain consistent coverage and service to mobile stations 204 in the repeater 401 coverage area, it is desirable to keep the pilot signal transmitted from the base station 202 at a constant level at the output of the repeater 401. This is the forward link pilot output power level 514. In the repeater 401, the forward link gain 516 of the repeater 401 is set to achieve a desired pilot forward link output power level 514. If either the repeater 401 forward link gain 516 or the forward link path loss 512 seen between the base station 202 and the repeater 401 varies, then the desired pilot output power 514 will also vary, causing an undesirable shrinking or growing of the repeater 401 coverage area. Embodiments herein provide a way to measure the forward link path loss 512 plus the forward link repeater gain 516 and to use this information to maintain a stable forward link pilot output power 514.

One way the subscriber unit 501 embedded into the links 402, 404 of a repeater 401 may be used to maintain the forward link pilot output power level 514 of a repeater 401 is by measuring and averaging two parameters: (1) the total in-band power it receives, referred to as the receive power level 510, and (2) the receive Ec/Io level 520. These two parameters may be added together to generate a single forward link reference used to maintain the forward link pilot output power level 514 of a repeater 401. Any variation in this reference indicates a change in either the repeater forward link gain 516 or forward link path loss 512.

As described, a subscriber unit 501 is embedded into the repeater 401 and its links 502, 504 are integrated into the repeater links 402, 404. The receive power level 510 and receive Ec/Io level 520 may be used to measure the forward link path loss 512 seen between the base station 202 and the repeater 401 and the forward link repeater gain 516. The subscriber unit 501 can average the receive power level 510 and receive Ec/Io level 520 to remove fading effects, leaving path loss and forward link gain information. This path loss information 512 and gain information 516 can be used to set and maintain the forward link pilot output power 514 of the repeater 401. Likewise, the subscriber unit 501 may be put into traffic and its transmit power level 506 may be used to measure the path loss seen between the repeater 401 and the base station 202.

Reference power levels may be stored to modify the forward link pilot output power level 514. The current receive power level 510 may be stored as a reference receive power level 518. The current transmit power level 506 may be stored as a reference transmit power level 508. The current receive Ec/Io level 520 may be stored as a reference Ec/Io level 522. Any combination of the receive power level 510 and/or the transmit power level 506 and/or the Ec/Io level 520 may be stored in the reference levels 518, 508, 522 and re-measured again at a later time. The re-measured value can be compared to the stored value to check for changes in path loss or forward link repeater gain. The repeater 401 forward link gain can then be moved to compensate and return the repeater 401 to its desired forward link pilot output power 514.

Figure 6:
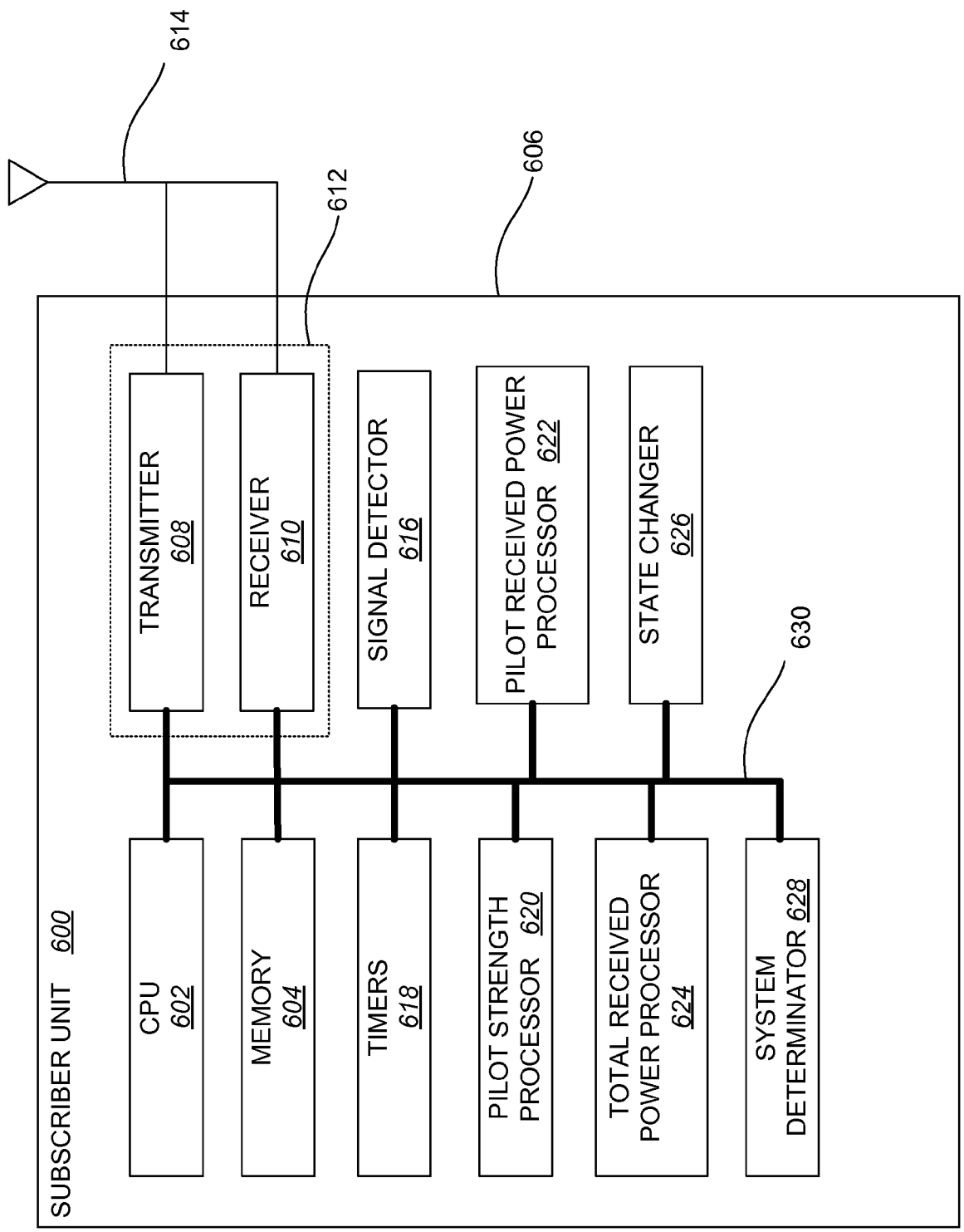
FIG. 6 illustrates a block diagram of certain components in an embodiment of a subscriber unit.

An embodiment of a subscriber unit 501 is shown in a system 600 illustrated in the functional block diagram of FIG. 6. The system 600 includes a central processing unit (CPU) 602 which controls operation of the system 600. A memory 604, which may include both read-only memory (ROM) and random access memory (RAM), provides instructions and data to the CPU 602. A portion of the memory 604 may also include non-volatile random access memory (NVRAM).

The system 600, which is typically embodied in a wireless communication device such as a cellular telephone, also includes a housing 606 that contains a transmitter 608 and a receiver 610 to allow transmission and reception of data, such as audio communications, between the system 600 and a remote location, such as a cell site controller or base station 202. The transmitter 608 and receiver 610 may be combined into a transceiver 612. An antenna 614 is attached to the housing 606 and electrically coupled to the transceiver 612. The operation of the transmitter 608, receiver 610, and antenna 614 is well known in the art and need not be described herein.

The system 600 also includes a signal detector 616 used to detect and quantify the level of signals received by the transceiver 612. The signal detector 616 detects such signals as total energy, pilot energy per pseudonoise (PN) chips, power spectral density, and other signals, as is known in the art. Various indicators and values are calculated by the signal detector 616 for use in the system 600, as described in further detail below.

A set of timers 618 works in conjunction with a pilot strength processor 620, a pilot received power processor 622, and a total received power processor 624. By measuring the levels of the signals received and processing these signals, the system 600 can determine the quality of the communication channel between the wireless communication device and its base station 202.

The pilot strength processor 620 receives a pilot strength indicator (Ec/Io) from the signal detector 616. The signal detector 616 divides the ratio of pilot energy per PN chip (Ec) by the total power spectral density received at the transceiver 612 (Io). This ratio of pilot energy to overall received energy is called "pilot strength," as is known in the art. Also as known in the art, the pilot strength depends on loading conditions of an active cell and adjacent cells, and thus is an indication of traffic load in a particular cell.

The total received power processor 624 uses a variable Rx that is detected and quantified at the signal detector 616. The total received power (Rx) is a measure of all power received at the transceiver 612. It includes thermal noise, interference from other callers and a pilot signal transmitted to that particular transceiver 612. A total of all this energy received is stored to indicate the total received power.

The pilot received power processor 622 receives a Received Signal Strength Indicator (RSSI) from the signal detector 616. The RSSI indicates the pilot received power and, in an exemplary embodiment, is calculated by adding the total received power (Rx) with the (Ec/Io), as is known in the art. The RSSI is independent of system loading and variation in the RSSI indicates forward link path loss changes. These path loss changes are important in determining when to switch service, described in detail below.

A state changer 626 of the system 600 controls the state of the wireless communication device based on a current state and additional signals received by the transceiver 612 and detected by the signal detector 616. The wireless communication device is capable of operating in any one of a number of states.

The system 600 also includes a system determinator 628 used to control the wireless communication device and determine which service provider system the wireless communication device should transfer to when it determines the current service provider system is inadequate.

The various components of the system 600 are coupled together by a bus system 630 which may include a power bus, a control signal bus, and a status signal bus in addition to a data bus. However, for the sake of clarity, the various busses are illustrated in FIG. 6 as the bus system 630. One skilled in the art will appreciate that the system 600 illustrated in FIG. 6 is a functional block diagram rather than a listing of specific components. For example, although the pilot strength processor 620, pilot received power processor 622, and the total received power processor 624 are illustrated as three separate blocks within the system 600, they may in fact be embodied in one physical component, such as a digital signal processor (DSP). They may also reside as program codes in the memory 604 and operated on by the CPU 602. The same considerations apply to the other components listed in system 600 of FIG. 6.

The power adjustment commands compensate for the time-varying path loss in the wireless channel. Path loss in the wireless channel is defined as degradation or loss suffered by a signal as it travels between the subscriber unit 501 and the base station 202. Path loss is characterized by two separate phenomenons: average path loss and fading. In a typical wireless system, the forward link and reverse link operate on different frequencies. Nevertheless, because the forward and reverse links operate within the same frequency band, a significant correlation exists between the average path loss of the two links. On the other hand, fading is an independent phenomenon for the forward and reverse link and varies rapidly as a function of time, especially when the remote unit is in motion or is located near objects in motion.

In an exemplifying wireless system, each subscriber unit 501 estimates the path loss of the forward link based on the total power at the input of the remote unit. The total power is the sum of the power from all base stations 202 operating on the same frequency assignment as perceived by the subscriber unit 501. From the estimate of the average forward link path loss, the subscriber unit 501 sets a nominal transmit power level of the reverse link signal.

As noted above, each base station 202 with which the subscriber unit 501 has established communications sends power adjustment commands to the subscriber unit 501 to compensate for differences between the path loss on the forward link and the path loss on the reverse link, for fading, and for other sources of error. Thus, the subscriber unit 501 creates a reverse link transmit gain adjustment signal which increases or decreases the reverse link transmit power level above or below the nominal level determined by estimating the average forward link path loss. The value of the transmit gain adjustment signal is the accumulated effect of the power control adjustment commands received from the base station 202 over a period of time. If the subscriber unit 501 receives an equal number of turn-up and turn-down commands, the value of the transmit gain adjustment signal is zero and the reverse link transmit level is equal to the nominal value. If the subscriber unit 501 receives more turn-up than turn-down commands, the value of the transmit gain adjustment signal is logically positive and the reverse link transmit level is greater than the nominal value. If the remote unit receives more turn-down than turn-up commands, the value of the transmit gain adjustment signal is logically negative and the reverse link transmit level is less than the nominal value.

In general, the use of repeaters 401 in CDMA networks is desired by service providers for reasons of hole filling and for otherwise augmenting the area of coverage for a given sector. Hole filling means to provide capacity in an area that was previously not covered. One mark of a hole filling application is that the area is generally surrounded by coverage, often with the very sector that is also in communication with the repeater 401. Augmenting, or moving, the coverage area of a sector refers to shifting the location or the shape of the coverage area from a sector. An example of this latter application might be to provide highway coverage. Assuming that two sectors cover the highway adjacent to a base station 202, it might be considered to use a repeater 401 in order to provide coverage to an area beyond that immediately visible from the base station 202 location.

However, and as mentioned above, the performance of the repeater 401 can degrade by its forward link pilot output power level 514 deviating from its operating point. Specifically, the repeater 401 is affected by a number of factors including temperature variations during the day, temperature variations from one season to another, attenuation caused by foliages during spring and summer and/or new obstacles being erected along the base station-repeater link.

The phenomena stated above will adversely affect coverage as well as service in the repeater 401 coverage area. Therefore, it is desirable to have the ability to detect and quantify the change, and restore the pilot output power of the repeater 401 back to a pre-determined level. As illustrated herein, this can be accomplished by embedding a subscriber unit 501 inside the repeater 401.

Figure 7:
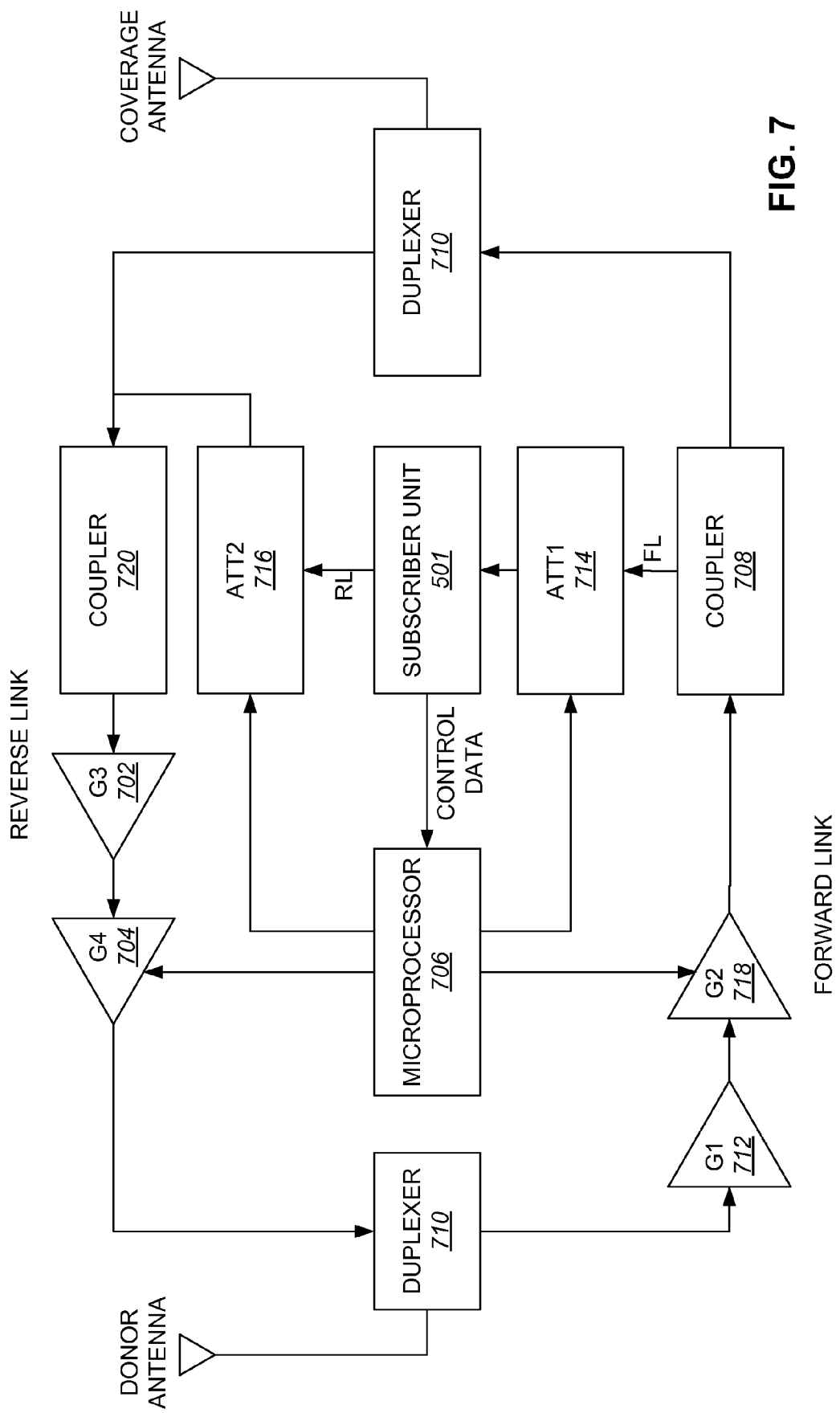
FIG. 7 is a block diagram of an embodiment of a power-controlled repeater illustrating the forward link and the reverse link.

A block diagram of one embodiment of the power-controlled repeater 401 is shown in FIG. 7. As shown in FIG. 7, the forward and reverse links of the embedded subscriber unit 501 are common with those of the repeater 401, and, in addition, the forward link signal of the embedded subscriber unit 501 will experience the same fluctuations in gain as the repeater 401. It will be appreciated by those skilled in the art that various changes may be made to the block diagram of FIG. 7 to achieve various alternative embodiments. For example, the subscriber unit 501 may only be inserted into the forward link rather than being inserted into both the forward and reverse links.

The requirement on the forward link power amplifier output is primarily driven by the size of the desired coverage area, and the requirement is typically expressed in terms of the maximum average power, $W_R$. However, since the instantaneous power on the forward link of the repeater 401 can be substantially higher than $W_R$, the requirement on the forward link power amplifier output should be extended to the maximum instantaneous power to avoid saturation, and the maximum instantaneous power is related to the maximum average power by the peak-to-average ratio in CDMA networks.

In calculating the gain of the repeater 401, it is assumed that the forward link gain and the reverse link gain are identical. Furthermore, $W_B$ is defined as the power amplifier output of the base station 202 (the typical value is 25 W). $W_R$ is defined as the forward link power amplifier output of repeater 401. From the target forward link power amplifier output, $W_R$, the base station-repeater link gain ($G_T$) may be calculated as shown in Formula 1.

$$G_T = \frac{W_R}{W_B}.$$ Formula 1

The gain of the repeater 401 may be calculated as shown in Formula 2. $G_T$ is the base station-repeater link gain. $G_d$ is the gain of the repeater donor antenna. $L_p$ is the target path loss between the repeater donor antenna and the base station antenna. $G_a$ is the antenna gain of the base station antenna.

$$G_R = \frac{G_T}{G_d L_p G_a} = \frac{W_R}{W_B} \frac{1}{G_d L_p G_a}.$$ Formula 2

Referring to FIG. 7, in dB, the forward link gain of the power-controlled repeater can be decomposed into that shown by Formula 3. In Formula 3, CL is the coupler 708 loss and DL is the duplexer 710 loss.

$$G_R = G1 + G2 + CL + 2DL$$ Formula 3.

In selecting G1 712, the forward link coupler 708 to the embedded subscriber unit 501, and the forward link attenuator 714 of the embedded subscriber unit, ATT1 714, it is important to ensure that the embedded subscriber unit 501 will receive an adequate amount of forward link overhead channel power (pilot, paging and sync). A typical minimum amount of forward link overhead channel power is −85 dBm.

Since it is assumed that the forward link gain and the reverse link gain are identical, the reverse link gain of the power-controlled repeater is $G_R$ as well, and, from FIG. 7, in dB, it can be decomposed into that illustrated by Formula 4. In Formula 4, CL is the coupler 708 loss and DL is the duplexer 710 loss.

$$G_R = G3 + G4 + CL + 2DL$$ Formula 4.

The embedded subscriber unit 501 may be used to adjust G2 718 to control the forward link gain of the repeater. A microprocessor 706 may be used in controlling various parameters and components of the repeater 401. Theoretically, changing G2 718 is going to alter the nominal noise factor of the repeater 401. However, this analysis assumes that the nominal noise factor of the repeater 401 is constant and can be made substantially constant by allocating sufficient gain in G1 712.

Specifically, from the anticipated changes in G2 718 (per embedded subscriber unit 501), and the anticipated noise factor of G2 718, one may calculate how many dB should G1 712 exceed the nominal G2 718 in order for the nominal noise factor of the repeater 401 to vary less than some predetermined amount.

For example, if G2 718 were expected to change by 10 dB, and, from the anticipated noise factor of G2 718, it is concluded that G1 712 should exceed the nominal G2 718 by 40 dB in order for the nominal noise factor of the repeater 401 to vary less than 1%, the constraint shown in Formula 5 is used. Combining the equations shown in Formulas 3 and 5 provides the equation shown in Formula 6. CL is the coupler 708 loss. DL is the duplexer loss. Once G2 718 is determined, G1 712 may be obtained from Formula 5.

$$G1 = G2 + 10 \text{ dB} + 40 \text{ dB} = G2 + 50 \text{ dB}$$ Formula 5.

$$G_R = (G2 + 50 \text{ dB}) + G2 + CL + 2DL$$ Formula 6.

$$G2 = 0.5(G_R - CL - 2DL - 50 \text{ dB})$$ Formula 7.

For the embedded subscriber unit 501, the gain of its forward link path in the repeater 401 should be equal to the gain of its reverse link path in the repeater 401. Specifically, the reverse link attenuator 716 of the embedded subscriber unit, ATT2 716, should be set such that the equation in Formula 8 is true. In Formula 8, CL is the coupler loss.

$$G1 + G2 + CL + ATT1 = ATT2 + CL + G3 + G4$$ Formula 8.

The deployment of a repeater with forward link gain control is very similar to that of a conventional repeater with the addition of the embedded subscriber unit in the repeater to establish a forward link reference. This reference may comprise the sum of the received power and the received Ec/Io level and/or the transmit power of the embedded subscriber unit. In deploying the repeater, the steps shown in FIG. 8 may be followed. The forward link gain of the repeater 401 is adjusted 802 to achieve target forward link pilot power amplifier output. Then the reverse link gain of the repeater is adjusted 804 to balance the forward link and the reverse link. Finally, the forward link reference power of the embedded subscriber unit is established 806.

Regarding the step of adjusting 802 the forward link gain, the target repeater forward link pilot power amplifier output, $W_R$, is driven by the size of the desired coverage area. To meet $W_R$, the gain G2 718 is adjusted.

With the forward link gain of the power-controlled repeater 401 set, the next step is to balance 804 the forward link and the reverse link in both the base station 202 and repeater 401 coverage areas. To accomplish this task the gain G4 704 may be adjusted.

FIG. 9 is a flow diagram illustrating a method 900 for controlling the forward link gain through use of the embedded subscriber unit 501. First, the received power and received Ec/Io are obtained 902. Then this received power and received Ec/Io levels are used 904 to measure the forward link path loss and forward link repeater gain. The received power and Ec/Io levels may be averaged 906 to minimize the effects of fading. Then the path loss and forward link repeater gain information may be used 908 to set and maintain the forward link repeater output power.

Figures 10, 11:
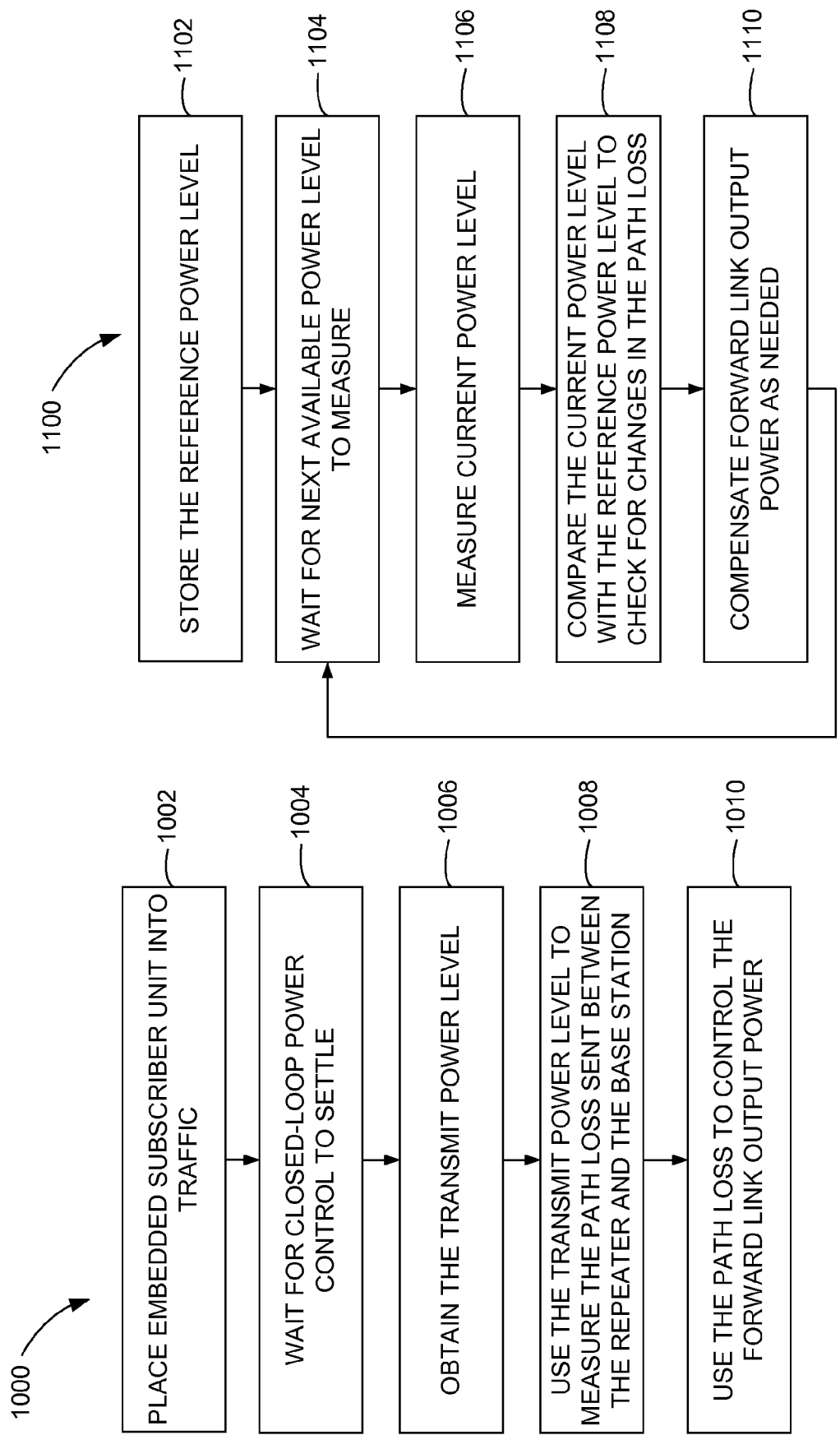
FIG. 10 is a flow diagram illustrating another method for controlling the forward link gain of a repeater through use of an embedded subscriber unit.
FIG. 11 is a flow diagram illustrating a further method for controlling the forward link gain of a repeater through use of an embedded subscriber unit.

FIG. 10 is a flow diagram illustrating another method 1000 for controlling the forward link gain through use of the embedded subscriber unit 501. First, the embedded subscriber unit 501 is placed 1002 into traffic. The embodiment of FIG. 10 then waits 1004 for the closed-loop power control to settle. Once in traffic mode, the transmit power level of the subscriber unit 501 is obtained 1006. The transmit power level may be used 1008 to measure the forward link path loss between the repeater 401 and the base station 202. Then the path loss information may be used 1010 to set and maintain the forward link gain output power.

FIG. 11 is a flow diagram illustrating yet another method 1100 for controlling the forward link gain through use of the embedded subscriber unit 501. In this method, either the transmit power level or the receive power level or the received Ec/Io level may be used. First a reference power level is stored 1102. The reference power level that is stored may be either the current transmit power level and/or the current receive power level and/or the received Ec/Io level. The method may wait 1104 for some time period until it again measures the current power level. When the current power level is measured 1106, the current power level may be compared 1108 with the reference power level to check for changes in the forward link path loss or forward link repeater gain. Then the path loss information may be used to compensate 1110 to modify the forward link gain output power as needed. The method as shown in FIG. 11 may be iterated through to continually monitor the power levels.

In summary, repeaters will allow carriers and service providers to fill holes in the coverage area or to augment the area of coverage. However, the use of repeaters is thwarted by fluctuations in the environment and in the repeater gain. These fluctuations could adversely affect the coverage and service in the repeater coverage area.

From the problem described above, it is desirable to maintain a constant repeater forward link pilot output power. This objective may be met by embedding a subscriber unit inside the repeater, and by inserting the links of the embedded subscriber unit into the links of the repeater. With common forward and reverse links, the embedded subscriber unit may be used to calibrate the gain of the repeater.

During the installation of a repeater with forward link gain control, the presence of the embedded subscriber unit allows the establishment of a forward link reference to go along with the nominal repeater forward link path loss and gain. After installation is complete, the embedded subscriber unit can perform periodic calibrations. Any deviation from the forward link reference would indicate a change in the repeater forward link gain or path loss.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A repeater comprising:
    receive circuitry configured to receive signals including a pilot signal from a base station;
    a signal detector configured to receive information indicative of the pilot signal from the base station and to determine a receive Ec/Io level indicative of the ratio of pilot energy per PN chip to the total received power spectral density (Ec/Io);
    a total received power processor configured to determine a receive power level;
    a processor configured to determine a forward link path loss based on the receive power level and the receive Ec/Io level, the processor further configured to output a control signal to maintain a substantially consistent forward link pilot output power through use of the forward link path loss.

2. The repeater of claim 1, wherein the processor comprises a microprocessor configured to receive control data from a subscriber unit, and wherein the signal detector and the total received power processor are included in the subscriber unit.

3. The repeater of claim 2, further comprising a variable gain amplifier to receive the control signal from the processor.

4. The repeater of claim 3, wherein the processor is configured to compare the forward link path loss to an associated forward link reference level, and wherein the processor is configured to generate a control signal to adjust a gain of the variable gain amplifier based on the comparing.

5. The repeater of claim 1, wherein the signal detector and the total received power processor are integrated in a single physical component.

6. The repeater of claim 1, wherein the signal detector and the total received power processor comprise program code stored in memory.

7. A method of adjusting forward link gain of a repeater comprising:
    receiving a pilot signal from a base station at the repeater;
    generating a receive Ec/Io level indicative of the ratio of pilot energy per PN chip to the total received power spectral density (Ec/Io);
    determining a receive power level;
    determining a forward link path loss based on the receive power level and the receive Ec/Io level; and
    outputting a control signal to maintain a substantially consistent forward link pilot output power through use of the forward link path loss.

8. The method of claim 7, wherein outputting a control signal to maintain a substantially consistent forward link pilot output power comprises outputting a control signal to modify a forward link gain of the repeater based on a difference between a current forward link path loss and a reference forward link path loss.

9. The method of claim 8, further comprising:
averaging the receive power level and the receive Ec/Io level to substantially remove fading.

10. A non-transitory computer readable storage medium including instructions to cause one or more machines to perform operations comprising:
receiving information indicative of a pilot signal received from a base station at the repeater;
generating a receive Ec/Io level indicative of the ratio of pilot energy per PN chip to the total received power spectral density (Ec/Io);
determining a receive power level;
determining a forward link path loss based on the receive power level and the receive Ec/Io level; and
generating information indicative of a control signal to maintain a substantially consistent forward link pilot output power through use of the forward link path loss.

11. The computer readable medium of claim 10, wherein generating the information indicative of the control signal to maintain a substantially consistent forward link pilot output power comprises generating the information indicative of the control signal based on a difference between a current forward link path loss and a reference forward link path loss.

12. The computer readable medium of claim 10, wherein the operations further comprise averaging the receive power level and the receive Ec/Io level to substantially remove fading.

13. A repeater comprising:
means for receiving information indicative of a pilot signal received from a base station at the repeater;
means for generating a receive Ec/Io level indicative of the ratio of pilot energy per PN chip to the total received power spectral density (Ec/Io);
means for determining a receive power level;
means for determining a forward link path loss based on the receive power level and the receive Ec/Io level; and
means for generating information indicative of a control signal to maintain a substantially consistent forward link pilot output power through use of the forward link path loss.

14. The repeater of claim 13, wherein the means for generating the information indicative of the control signal to maintain a substantially consistent forward link pilot output power comprises means for generating the information indicative of the control signal based on a difference between a current forward link path loss and a reference forward link path loss.

15. The repeater of claim 13, further comprising:
means for averaging the receive power level and the, receive Ec/Io level to substantially remove fading.

16. The repeater of claim 13, wherein the means for generating a receive Ec/Io level indicative of the ratio of pilot energy per PN chip to the total received power spectral density (Ec/Io) and the means for determining a receive power level are included in a subscriber unit.

17. The repeater of claim 13, wherein the means for generating a receive Ec/Io level indicative of the ratio of pilot energy per PN chip to the total received power spectral density (Ec/Io) and the means for determining a receive power level are implemented at least partially as program codes stored in memory.

18. The repeater of claim 13, wherein the .means for generating a receive Ec/Io level indicative of the ratio of pilot energy per PN chip to the total received power spectral density (Ec/Io) and the means for determining a receive power level are implemented as a single physical component.

19. The repeater of claim 18, wherein the single physical component is a digital signal processor.

20. The repeater of claim 13, further comprising means for receiving the control signal and changing a forward link gain of the repeater based on the control signal.

* * * * *